US008831338B2

United States Patent
Shibuhisa et al.

(10) Patent No.: US 8,831,338 B2
(45) Date of Patent: Sep. 9, 2014

(54) IMAGE PROCESSOR, IMAGE DISPLAY APPARATUS, AND IMAGE TAKING APPARATUS

(75) Inventors: Nao Shibuhisa, Osaka (JP); Kei Tokui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 126 days.

(21) Appl. No.: 13/696,774

(22) PCT Filed: May 24, 2011

(86) PCT No.: PCT/JP2011/061821
§ 371 (c)(1),
(2), (4) Date: Nov. 7, 2012

(87) PCT Pub. No.: WO2011/148921
PCT Pub. Date: Dec. 1, 2011

(65) Prior Publication Data
US 2013/0051660 A1    Feb. 28, 2013

(30) Foreign Application Priority Data

May 26, 2010    (JP) .................................. 2010-120216

(51) Int. Cl.
*G06K 9/36*    (2006.01)
*G02B 27/26*    (2006.01)
*H04N 13/00*    (2006.01)
*H04N 13/02*    (2006.01)

(52) U.S. Cl.
CPC ...... *H04N 13/026* (2013.01); *H04N 2013/0081* (2013.01); *H04N 13/0239* (2013.01); *H04N 13/0022* (2013.01)
USPC ............. 382/154; 382/172; 382/282; 348/51; 359/462

(58) Field of Classification Search
USPC ................. 382/154, 173, 172, 282, 194, 168; 348/42, 51, 49, 43; 359/462
See application file for complete search history.

(56) References Cited

U.S. PATENT DOCUMENTS

| 5,748,199 A | * | 5/1998 | Palm | 345/473 |
| 6,163,336 A | * | 12/2000 | Richards | 348/42 |
| 8,320,641 B2 | * | 11/2012 | Steinberg et al. | 382/117 |
| 8,405,708 B2 | * | 3/2013 | Robinson et al. | 348/42 |

FOREIGN PATENT DOCUMENTS

JP    6-194602 A    7/1994
(Continued)

OTHER PUBLICATIONS

"3DC Safety Guidelines for Dissemination of Human-friendly 3D", Safety/Guidelines Section, revised on Apr. 20, 2010, pp. 1-41.

*Primary Examiner* — Sheela Chawan
(74) *Attorney, Agent, or Firm* — Birch, Stewart, Kolasch & Birch, LLP

(57) ABSTRACT

Disclosed is an image processor generating a three-dimensional image easily three-dimensionally viewed by, and hardly causing fatigue of, an observer, and easily adjusting a three-dimensional effect of an arbitrary portion in the three-dimensional image. The disparity correction portion 101 corrects a disparity of the input disparity image within a predetermined range and outputs a disparity image storing the corrected disparity to the disparity conversion portion 103. The disparity conversion portion 103 converts the disparity of the disparity image such that a disparity corresponding to the image of the main object determined by the main object determination portion 102 reaches a predetermined value, and outputs the disparity image obtained after the conversion to an image generation portion 104. The image generation portion 104 generates an image for the left eye and an image for the right eye based on the input disparity image and the input captured image, and outputs the images to a display apparatus. As a result, the disparity is converted such that the three-dimensional effect of the main object is enhanced.

7 Claims, 17 Drawing Sheets

(56) References Cited

FOREIGN PATENT DOCUMENTS

| JP | 10-191397 A | 7/1998 |
| JP | 2003-209858 A | 7/2003 |
| JP | 2004-221700 A | 8/2004 |
| JP | 2005-91508 A | 4/2005 |

* cited by examiner

IMAGE PROCESSOR, IMAGE DISPLAY APPARATUS, AND IMAGE TAKING APPARATUS

TECHNICAL FIELD

The present invention relates to an image processor generating a three-dimensional image, an image display apparatus including the image processor, and an image taking apparatus including the image processor.

BACKGROUND OF THE INVENTION

A device is proposed that takes images of the same object (hereinafter simply referred to as an identical object) at the same time with two cameras for left and right eyes arranged side-by-side so as to generate a three-dimensional image (also referred to as a stereoscopic image) through the execution of various image processes to two image data (hereinafter, simply referred to as images) generated by the two cameras (see Patent Document 1).

A gap between images generated by overlapping the two images is referred to as a disparity. This disparity varies depending on a distance from cameras to an object.

For example, it is assumed that two cameras are disposed on a straight line with the optical axes of the cameras arranged in parallel to take images of an identical object. In this case, if the object is distant, the disparity of the object is substantially zero. As a distance between the cameras and the object is reduced, the disparity of the object increases. Therefore, if a three-dimensional image is generated and output for display based on two images including an object with a larger disparity, a projection amount of the object increases (appears closer) and a three-dimensional effect is enhanced.

However, if the disparity is increased greater than a certain level, an image sensed by the left eye is not fused with an image sensed by the right eye and a double image appears and makes the stereoscopic viewing impossible (fusional limitation). A double image due to an excessive disparity is known to cause visual fatigue. Therefore, to comfortably view a three-dimensional image, a depth (projection, depression) range of an object must be limited when the image is displayed. This limitation is disclosed in Non-Patent Literature 1.

For example, Patent Document 1 discloses a technique of generating a three-dimensional image without generating a double image due to an excessive disparity. In the technique disclosed in Patent Document 1, a depth range is nonlinearly controlled such that a three-dimensional image is displayed within a three-dimensionally viewable range of an observer, so as to generate an image easily three-dimensionally viewed by the observer.

PRIOR ART DOCUMENTS

Patent Document

Patent Document 1: Japanese Laid-Open Patent Publication No. 2005-91508

Non-Patent Literature

Non-Patent Literature1: 3D consortium 3DC Safety Guidelines, URL: http://www.3dc.gr.jp/jp/scmt_wg_rep/3dc_guidelineJ_200812.pdf

SUMMARY OF THE INVENTION

Problem to be Solved by the Invention

If a main object desired to have an enhanced three-dimensional effect has no disparity close to the middle between the maximum and minimum photographable disparities, it is problematic that the three-dimensional effect of the main object is not sufficiently acquired. This problem will specifically be described with reference to FIGS. 16 and 17.

FIG. 16 is a schematic of a main object 1600, a main object 1601, and a background 1602, and a distance from cameras not depicted to the main object 1600 is the shortest and the distance is increased in the order of the main object 1601 and the background 1602.

As described above, various image processes are executed for images acquired by shooting the main objects 1600, 1601, and the background 1602 by two cameras disposed on a straight line to generate a three-dimensional image, which is output for display on a three-dimensional image display apparatus (hereinafter, simply referred to as a display apparatus).

Since a distance from the cameras is increased in the order of the main objects 1600, 1601, and the background 1602, when $\gamma$ denotes a disparity of the main object 1600 and $\beta$ denotes a disparity of the main object 1601, $\gamma > \beta$ is satisfied. It is assumed that the disparity $\gamma$ of the main object 1600 and the disparity $\beta$ of the main object 1601 are not disparities close to the middle between the maximum and minimum photographable disparities. The background 1602 is located furthest from the cameras and, therefore, the background 1602 has the smallest disparity $\alpha$.

FIG. 17 is a schematic of a state of a three-dimensional image perceived by a viewer when the three-dimensional image is generated by executing various image processes for images acquired by shooting the main objects 1600, 1601, and the background 1602 depicted in FIG. 16 and is displayed on a display panel P of the display apparatus. A hiragana character "a" on the display panel P indicates the position of the display panel.

The main object 1600 is perceived in the vicinity of a position 1700; the main object 1601 is perceived in the vicinity of a position 1701; and the background 1602 is perceived in the vicinity of a position 1702.

When the three-dimensional image of the main objects 1600, 1601, and the background 1602 depicted in FIG. 16 is displayed on the display panel P in this way, the three-dimensional image is perceived by an observer such that the main objects 1600 and 1601 are depressed in the vicinity of the background 1602. As a result, the three-dimensional effect of the objects is not sufficiently acquired, resulting in a weakened three-dimensional effect perceived as a three-dimensional image.

Particularly when a disparity of a main object is substantially identical to a disparity of a background or a foreground, the three-dimensional effect of the main object is significantly deteriorated.

It is an object of the present invention to solve the problem and to provide an image processor generating a three-dimensional image easily three-dimensionally viewed by, and hardly causing fatigue of, an observer, and easily adjusting a three-dimensional effect of an arbitrary portion in the three-dimensional image.

Means for Solving the Problem

A first technical means of the present invention is an image processor using a captured image from one view point and a disparity image corresponding to the captured image as inputs to generate a three-dimensional image based on the captured image and the disparity image, comprising: a disparity correction portion for correcting a disparity of the disparity image within a predetermined range; and a main object determination portion for determining at least one main object of the captured image, wherein the image processor converts a disparity of the disparity image such that a disparity corresponding to an image of at least one main object determined by the main object determination portion reaches to a predetermined value, and generates a three dimensional image based on a disparity image depending on the converted disparity and the captured image.

A second technical means of the present invention is an image processor using two captured images acquired by shooting an identical object from two viewing positions as inputs to generate a three-dimensional image based on the captured images, comprising: a disparity calculation portion for calculating a disparity from the two images; a disparity correction portion for correcting a disparity calculated by the disparity calculation portion within a predetermined range; and a main object determination portion for determining at least one main object of the captured image, wherein the image processor converts a disparity calculated by the disparity calculation portion such that a disparity corresponding to at least one main object determined by the main object determination portion reaches a predetermined value, and generates a three dimensional image based on the converted disparity and the captured image.

A third technical means is the image processor of the first technical means, wherein the disparity of the disparity image is converted into the predetermined value based on a linear function prescribing a relationship between an input disparity and an output disparity, and a graph showing the relationship between the input disparity and the output disparity is made by connecting a plurality of line segments having different slopes.

A fourth technical means is the image processor of the first technical means, wherein the predetermined value is zero or a value within a predetermined range based on zero.

A fifth technical means is the image processor of the first technical means, comprising a blurring process portion for executing a blurring process for a pixel value of the captured image corresponding to an object having a disparity equal to or less than a first predetermined value or equal to or greater than a second predetermined value based on the disparity image and the captured image.

A sixth technical means is the image processor of the fifth technical means, wherein the blurring process portion increases a blurring amount corresponding to a pixel value of a main object in proportion to an absolute value of disparity of the main object in the captured image.

A seventh technical means is an image display apparatus comprising: the image processor of the first technical means.

An eighth technical means is an image taking apparatus comprising: the image processor of the first technical means.

Effect of the Invention

The image processor of the present invention generates a three-dimensional image easily three-dimensionally viewed by, and hardly causing fatigue of, an observer, and can easily adjust a three-dimensional effect of an arbitrary portion in the three-dimensional image through disparity conversion, and can easily enhance a three-dimensional effect and change a sense of depth of a main object.

Figure 1:
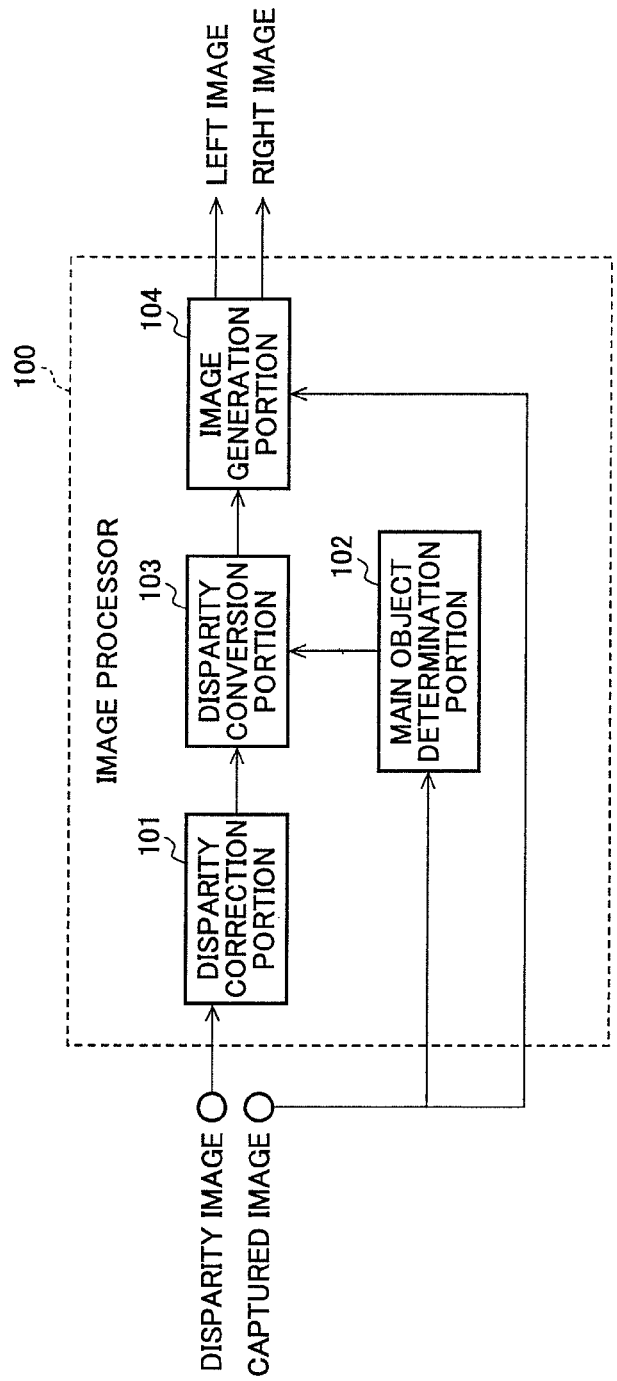
FIG. 1 is a functional block diagram of an image processor described in a first embodiment.

PREFERRED EMBODIMENT OF THE INVENTION (First Embodiment)

The present invention will now be described in detail with reference to the drawings. Configurations in the drawings are exaggeratingly depicted to facilitate understanding and have intervals and sizes different from actual configurations.

FIG. 1 is a functional block diagram of an image processor 100 of the present invention described in a first embodiment.

The image processor 100 is made up of a disparity correction portion 101, a main object determination portion 102, a disparity conversion portion 103, and an image generation portion 104 and uses a captured image from one view point and a disparity image corresponding to the captured image as inputs to generate a three-dimensional image based on the captured image and the disparity image.

A disparity image input from an external device (not depicted) etc., is input to the disparity correction portion 101. A captured image input from an external device etc., is input to the main object determination portion 102 and the image generation portion 104.

The disparity correction portion 101 corrects a disparity of the input disparity image within a predetermined range and outputs a disparity image storing the corrected disparity to the disparity conversion portion 103. The disparity image will be described later.

The main object determination portion 102 determines a main object of the input captured image and outputs the positional information of the main object to the disparity conversion portion 103.

The disparity conversion portion 103 extracts the disparity (corrected) corresponding to the image of the main object from the disparity image input from the disparity correction portion 101 based on the positional information of the main object input from the main object determination portion 102. The disparity conversion portion 103 converts the extracted disparity based on a predetermined conversion equation and outputs a disparity image storing the converted disparity to the image generation portion 104. Specifically, the disparity conversion portion 103 converts the disparity of the disparity image such that a disparity corresponding to the image of the main object determined by the main object determination portion 102 reaches a predetermined value. The predetermined value is a value causing the main object to be displayed on or near a display screen when the main object is displayed on a three-dimensional display apparatus. Specifically, the predetermined value is, for example, zero, or a value within a predetermined range based on zero. The predetermined value is adjustable.

As a result, the disparity is converted such that the three-dimensional effect of the main object is enhanced.

The image generation portion 104 generates an image for the left eye (left image) and an image for the right eye (right image) based on the input disparity image and the input captured image and outputs the images to a display apparatus (not depicted).

Therefore, the image generation portion 104 generates a three-dimensional image based on the disparity image using the disparity converted by the disparity conversion portion 103, and the captured image.

The details of the functional blocks will hereinafter be described in detail. First, the disparity image input to the disparity correction portion 101 will be described with reference to FIG. 2.

FIG. 2(A) is a schematic of a state in which cameras 202 and 203 shoot an object 201. The optic axes (dotted lines) of the cameras 202 and 203 are parallel and the cameras 202 and 203 are disposed on a straight line.

FIG. 2(B) is a schematic of a captured image (hereinafter referred to as the left image) 204 of the object 201 taken by the camera 202 on the left side and a captured image (hereinafter referred to as the right image) 205 of the object 201 taken by the camera 203 on the right side.

FIG. 2(C) is a schematically depicts an image acquired by overlapping the right image 205 with the left image 204 and FIG. 2(D) depicts a disparity image 206.

As depicted in FIG. 2(C), the object 201 (rectangular dotted line) in the right image 205 is shifted by X pixels to the left relative to the object 201 (rectangular dotted line) in the left image 204. The X pixels correspond to a disparity indicative of a gap of the identical object 201 in the two captured images (the left image 204 and the right image 205).

The disparity image means an image storing a disparity indicative of a gap of an identical object in two captured images of the identical object taken from two viewing positions correspondingly to the pixels of the object for each pixel. In the example described above, the disparity of the object is stored correspondingly to the object of the left image 204 for each pixel of the disparity image.

FIG. 2(D) schematically depicts a state in which a disparity X of the object 201 is stored in a pixel 206a of the disparity image 206.

Another pixel 206b of the disparity image 206 also stores a disparity of the object of the left image 204 corresponding to the pixel 206b.

The disparity may be on the basis of a pixel or a distance.

The disparity correction portion 101 corrects a disparity of a disparity image so as to suppress an excessive disparity. The correction of disparity can be performed in a well-known method described later.

Disparity correcting methods include two representative methods. One method is to normalize a disparity and the other method is to clip a disparity. The normalizing of disparity is characterized in that an overall depth relationship is preserved without saturating the disparity and the clipping of disparity is characterized in that a depth amount of an object having a disparity within a three-dimensionally viewable range is retained.

Figure 3:
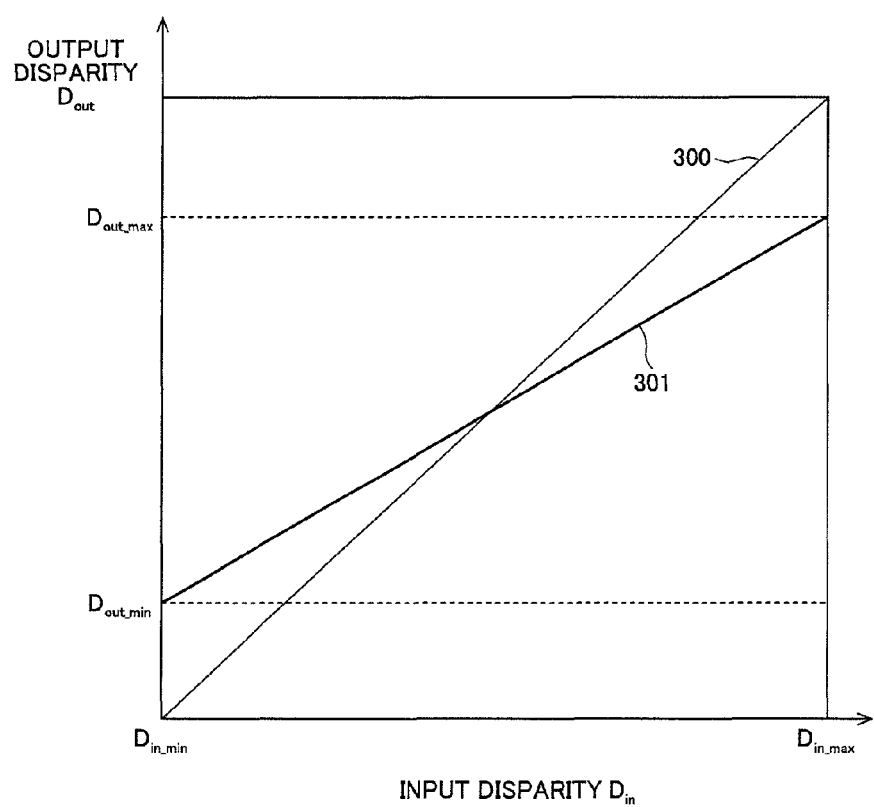
FIG. 3 is a graph of a disparity correction equation normalizing a disparity.
Figure 4:
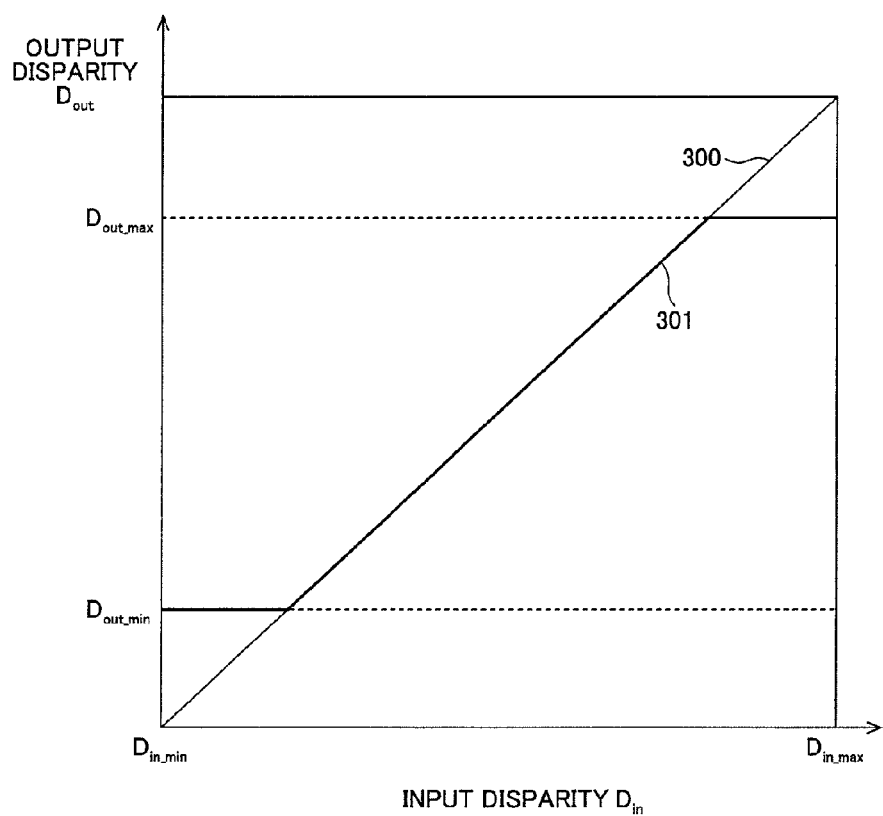
FIG. 4 is a graph of a disparity correction equation clipping a disparity.

FIG. 3 depicts an example of executing the disparity correction with the normalizing method and FIG. 4 depicts an example of executing the disparity correction with the clipping method.

FIG. 3 depicts a graph of a disparity correction equation normalizing the disparity and the disparity correction equation is expressed by (Eq. 1).

[Equation 1]

$$d_{out} = \frac{D_{out\_max} - D_{out\_min}}{D_{in\_max} - D_{in\_min}} d_{in} + D_{out\_max} - \frac{D_{out\_max} - D_{out\_min}}{D_{in\_max} - D_{in\_min}} D_{in\_max} \quad \text{(Eq. 1)}$$

FIG. 4 depicts a graph of a disparity correction equation clipping the disparity and the disparity correction equation is expressed by (Eq. 2) to (Eq. 4).

[Equation 2]

$$\text{When } D_{out\_min} < d_{in} < D_{out\_max} \, d_{out} = d_{in} \quad \text{(Eq. 2)}$$

[Equation 3]

$$\text{When } d_{in} \leq D_{out\_min} \, d_{out} = D_{out\_min} \quad \text{(Eq. 3)}$$

[Equation 4]

$$\text{When } D_{out\_max} \leq d_{in} \, d_{out} = D_{out\_max} \quad \text{(Eq. 4)}$$

The horizontal axes indicate an input disparity $D_{in}$ and the vertical axes indicate an output disparity $D_{out}$. The input disparity means a disparity of a disparity image input to the disparity correction portion 101 (uncorrected disparity) and the output disparity means a disparity of a disparity image output from the disparity correction portion 101 (corrected disparity). In the equations, $d_{in}$ corresponds to the input disparity $D_{in}$, and $d_{out}$ in the equations corresponds to the output disparity $D_{out}$.

$D_{in\_min}$ is the minimum disparity of an input disparity image and $D_{in\_max}$ is the maximum disparity of an input disparity image.

$D_{out\_min}$ is the minimum value of a three-dimensionally viewable disparity and $D_{out\_max}$ is the maximum value of a three-dimensionally viewable disparity and corresponds to the disparity of the fusional limitation.

A line 300 represents a relationship between the input disparity and the output disparity before executing the disparity correction and the input disparity and the output disparity have the same value before executing the disparity correction. A line 301 represents a relationship between the input disparity $D_{in}$ before the disparity correction and the output disparity $D_{out}$ after the disparity correction.

In the method of FIG. 3, $D_{in\_max}$ (the maximum value of the input disparity) is assigned to $D_{out\_max}$ (the maximum value of the three-dimensionally viewable disparity) and $D_{in\_max}$ (the minimum value of the input disparity) is assigned to $D_{out\_min}$ (the minimum value of the three-dimensionally viewable disparity) so as to correct the disparity within a three-dimensionally viewable range while an overall depth relationship is maintained without saturating the disparity.

In the method of FIG. 4, an input disparity equal to or greater than $D_{out\_max}$ (the maximum value of the three-dimensionally viewable disparity) is corrected to be $D_{out\_max}$ and an input disparity equal to or less than $D_{out\_min}$ (the minimum value of the three-dimensionally viewable disparity) is corrected to be $D_{out\_min}$. By saturating a three-dimensionally unviewable disparity to a three-dimensionally viewable disparity in this way, the disparity is corrected within a three-dimensionally viewable range while a depth amount is maintained.

The range of the three-dimensionally viewable binocular disparity depends on a screen size of a display apparatus and a viewing distance from an observer and Non-Patent Literature 1 describes that the range of the three-dimensionally viewable binocular disparity (fusional limitation) is up to about two degrees while a range of the binocular disparity allowing comfortable viewing of a three-dimensional image is equal to or less than one degree.

When $D_{out\_min}$ and $D_{out\_max}$ are determined based on a screen size of a display apparatus displaying a three-dimensional image and a standard disparity distance corresponding to the screen size, if the criteria of Non-Patent Literature 1 are used, the minimum disparity is −130 pixels and the maximum disparity is 130 pixels based on the position of the display apparatus (display panel) in the case of the 40-inch HD (1920×1080) resolution, for example.

A disparity image storing the disparity corrected by the disparity correction portion 101 is output to the disparity conversion portion 103.

The main object determination portion 102 determines a main object from objects of an input captured image and outputs positional information of the main object, for example, coordinate information indicative of a pixel position of the main object, to the disparity conversion portion 103. The determination of the main object can be implemented by a well-known method. For example, the method may be a method of selecting an object in focus from a captured image to determine the object as the main object, a method of executing a pattern recognition process to a captured image to determine an extracted object as the main object, or a method in which a user determines the main object by himself/herself. Alternatively, a facial recognition technique may be used for determining a certain person as the main object.

The disparity conversion portion 103 performs the conversion such that a disparity corresponding to an image of the main object determined by the main object determination portion 102 reaches a predetermined value. Specifically, the disparity is converted such that the three-dimensional effect of the object is enhanced. Assuming that the object 201 is the main object in the example of FIG. 2, the disparity X of the object 201 is the disparity corresponding to the image of the main object (disparity to be converted).

Description will be made of how objects are perceived by an observer when the objects are displayed with disparities set to zero and increased/decreased to positive/negative values on a display apparatus with reference to FIGS. 5 and 6.

Figure 5:
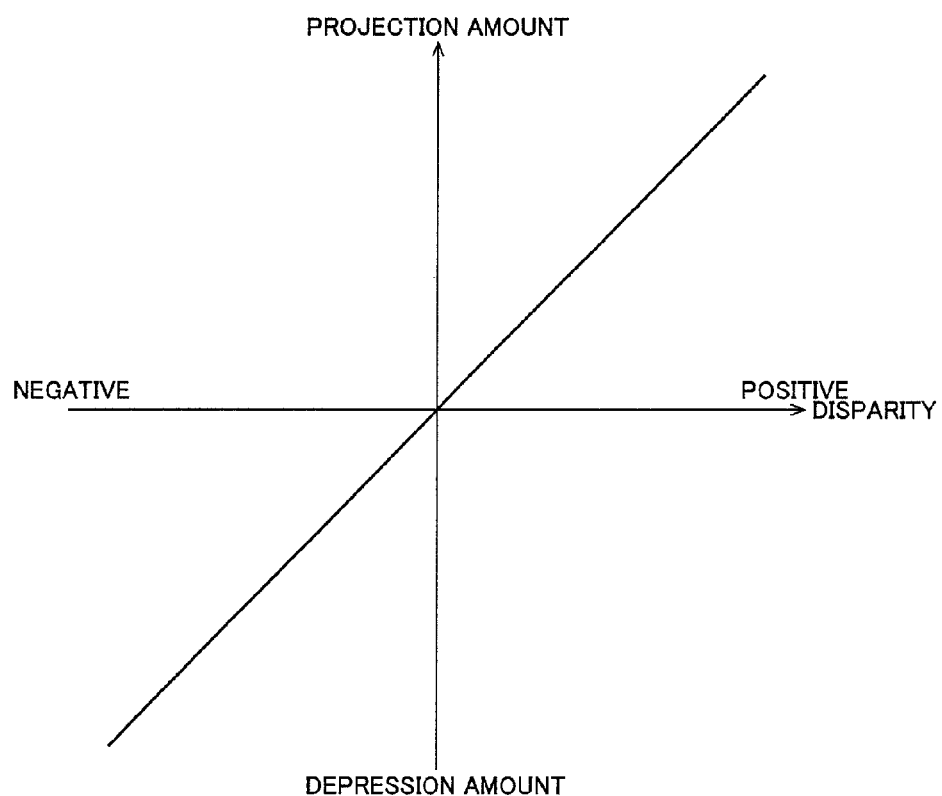
FIG. 5 is a graph of a relationship of a disparity between left and right images and a depth amount when an observer watches a display apparatus.

FIG. 5 is a graph of a relationship of a disparity between left and right images and a depth amount when an observer watches a display apparatus. The depth amount is a projection amount or a depression amount, and the projection amount is an amount giving an appearance closer to the observer than an actual display position while the depression amount is an amount giving an appearance further from the observer than the actual display position.

Specifically, when an object is displayed on a display apparatus, the object appears more projected when the disparity of the object is increased to a positive value while the object appears more depressed when the disparity is increased to a negative value. Since an object with zero disparity has no gap between left and right images, when the object is displayed on the display apparatus, the perceived position is on a display screen, making no difference from a depth position perceived two-dimensionally. Therefore, even if the image with zero disparity is displayed on the display apparatus, an observer does not perceive the presence of a depth and perceives the image as being two-dimensionally displayed at the position same as the actual display position. Displaying the object with zero disparity on a display apparatus means that an object is displayed on a display screen. The disparity of zero or a value within a predetermined range based on zero corresponds to the predetermined value.

Figure 6:
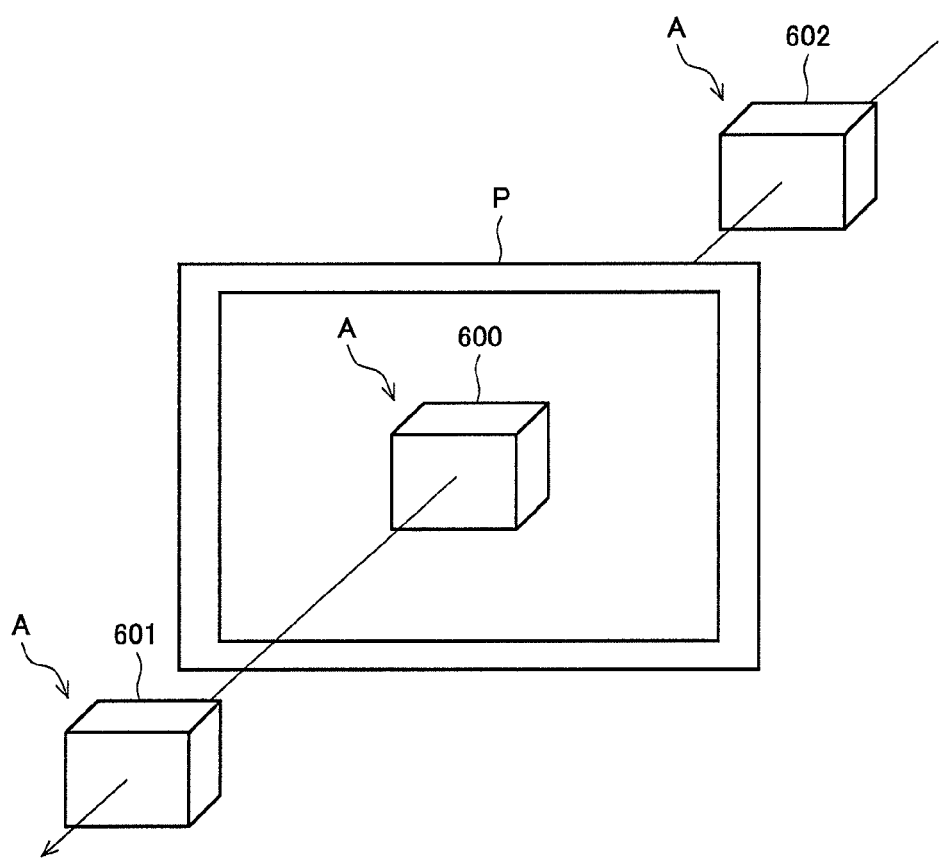
FIG. 6 is a schematic explaining how objects are perceived by an observer when the objects are displayed with disparities set to zero and increased/decreased to positive/negative values.

FIG. 6 is a schematic explaining how objects are perceived by an observer when the objects are displayed with disparities set to zero and increased/decreased to positive/negative values on a display apparatus.

It is assumed that $D_{in}$ (input disparity) is a disparity of a front side surface of an object A depicted in FIG. 6. If a value of the disparity $D_{in}$ is converted zero, i.e., the converted disparity is set to zero (hereinafter, the converted disparity is denoted by $D_{out}$) and the object A with zero disparity is displayed on a display apparatus P, the object A is perceived in the vicinity of a position 600, which is on the image display surface of the display apparatus P, by an observer.

If $D_{out}$ is set to a positive value, the object A is perceived as being projected on the front side of the image display surface as indicated by a position 601. If $D_{out}$ is set to a negative value, the object A is perceived as being depressed on the rear side of the image display surface as indicated by a position 602.

Figure 7:
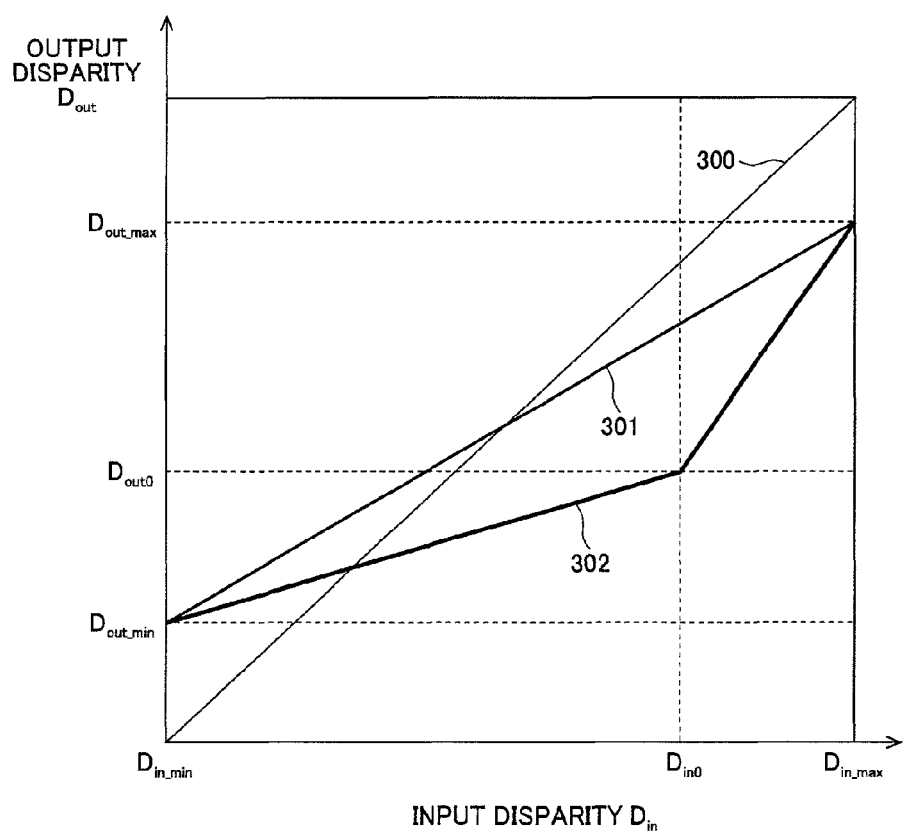
FIG. 7 is a graph of a disparity conversion equation executing the disparity conversion of a disparity corrected by normalization.
Figure 8:
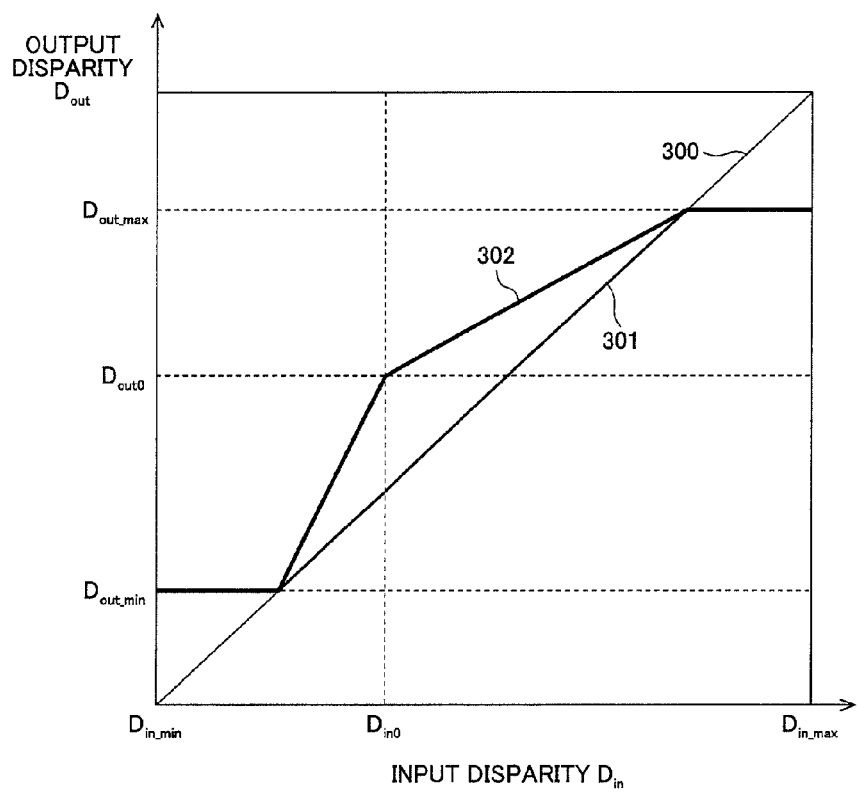
FIG. 8 is a graph of a disparity conversion equation executing the disparity conversion of a disparity corrected by clipping.

The conversion of the disparity can be executed with disparity conversion equations depicted in FIGS. 7 and 8, for example.

FIG. 7 is a graph of a disparity conversion equation executing the disparity conversion of a disparity corrected by the normalization and FIG. 8 is a graph of a disparity conversion equation executing the disparity conversion of a disparity corrected by the clipping.

The disparity conversion equation of FIG. 7 is expressed by (Eq. 5) and (Eq. 6).

[Equation 5]

$$d_{out} = \frac{D_{out0} - D_{out\_min}}{D_{in0} - D_{in\_min}} d_{in} + D_{out0} - \frac{D_{out0} - D_{out\_min}}{D_{in0} - D_{in\_min}} D_{in0} \quad \text{(Eq. 5)}$$

[Equation 6]

$$d_{out} = \frac{D_{out\_max} - D_{out0}}{D_{in\_max} - D_{in0}} d_{in} + D_{out0} - \frac{D_{out\_max} - D_{out0}}{D_{in\_max} - D_{in0}} D_{in0} \quad \text{(Eq. 6)}$$

The disparity conversion equation of FIG. 8 is expressed by (Eq. 7) to (Eq. 10).

[Equation 7]

When $d_{in} \le D_{out\_min}$ (Eq. 7)

$d_{out} = D_{out\_min}$

[Equation 8]

When $D_{out\_min} < d_{in} < D_{in0}$ (Eq. 8)

$$d_{out} = \frac{D_{out0} - D_{out\_min}}{D_{in0} - D_{out\_min}} d_{in} + D_{out0} - \frac{D_{out0} - D_{out\_min}}{D_{in0} - D_{out\_min}} D_{in0}$$

[Equation 9]

When $D_{in0} \le d_{in} < D_{out\_max}$ (Eq. 9)

$$d_{out} = \frac{D_{out\_max} - D_{out0}}{D_{out\_max} - D_{in0}} d_{in} + D_{out0} - \frac{D_{out\_max} - D_{out0}}{D_{out\_max} - D_{in0}} D_{in0}$$

[Equation 10]

When $D_{out\_max} \le d_{in}$ (Eq. 10)

$d_{out} = D_{out\_max}$

In this case, the input disparity $D_{in}$ denotes a disparity before the disparity conversion, and $D_{in\_max}$ and $D_{in\_min}$ denote the maximum disparity before the disparity conversion and the minimum disparity before the disparity conversion, respectively.

The output disparity $D_{out}$ denotes a disparity after the disparity conversion, and $D_{out\_max}$ and $D_{out\_min}$ denote the maximum disparity after the disparity conversion and the minimum disparity after the disparity conversion, respectively.

A line 302 represents a relationship between the input disparity $D_{in}$ before the disparity conversion and the output disparity $D_{out}$ after the disparity conversion. $D_{in0}$ and $D_{out0}$ may be set to any values.

In the equations, $d_{in}$ corresponds to the input disparity $D_{in}$ before the disparity conversion and $d_{out}$ in the equations corresponds to the output disparity $D_{out}$ after the disparity conversion.

The graphs of FIGS. 7 and 8 will be described with reference to FIG. 6.

In the graph of FIG. 7, the input disparity is decreased and, in the graph of FIG. 8, the input disparity is increased.

While the object A described with reference to FIG. 6 is perceived in the vicinity of the position 600, if the disparity conversion equation represented by the graph of FIG. 7 is used for decreasing and converting the disparity of the object A to a negative value, the object A is perceived as being depressed on the rear side of the image display surface as indicated by the position 602.

While the object A described with reference to FIG. 6 is perceived in the vicinity of the position 600, if the conversion equation represented by the graph of FIG. 8 is used for increasing and converting the disparity of the object A to a positive value, the object A is perceived as being projected on the front side of the image display surface as indicated by the position 601.

As depicted in FIGS. 7 and 8, the conversion equations are changed by using $D_{in0}$ as a boundary between the range of disparity smaller than $D_{in0}$ and the range of disparity larger than $D_{in0}$. Therefore, a depth amount from a main object to a background can be increased or decreased, thereby easily enhancing the three-dimensional effect.

Figure 16:
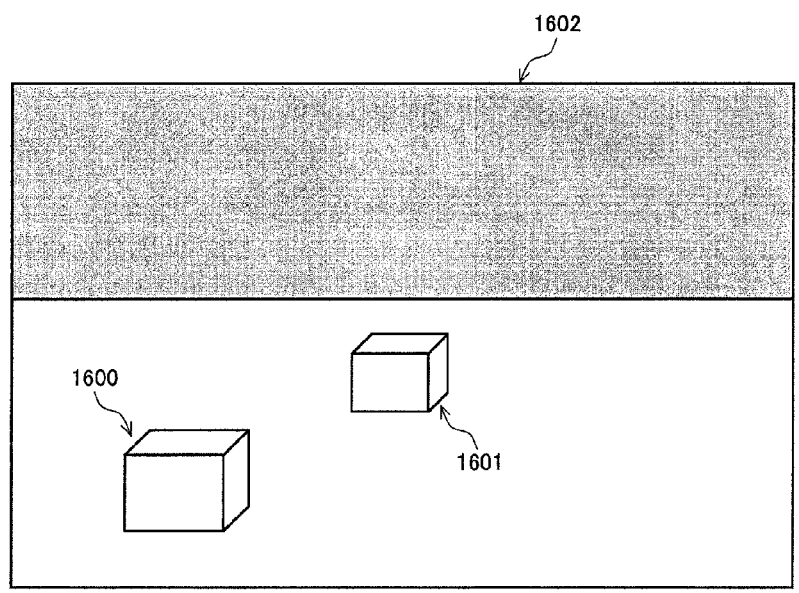
FIG. 16 is a schematic of main objects and a background.

Description will hereinafter be made of how the main object is perceived by an observer when the disparity of the main object depicted in FIG. 16 is converted by using, for example, the disparity conversion equation described in FIG. 8 to display the main object after the disparity conversion on a display apparatus with reference to FIGS. 9 and 10. A disparity conversion equation of FIG. 9 is the same conversion equation as the disparity conversion equation of FIG. 8.

Figure 9:
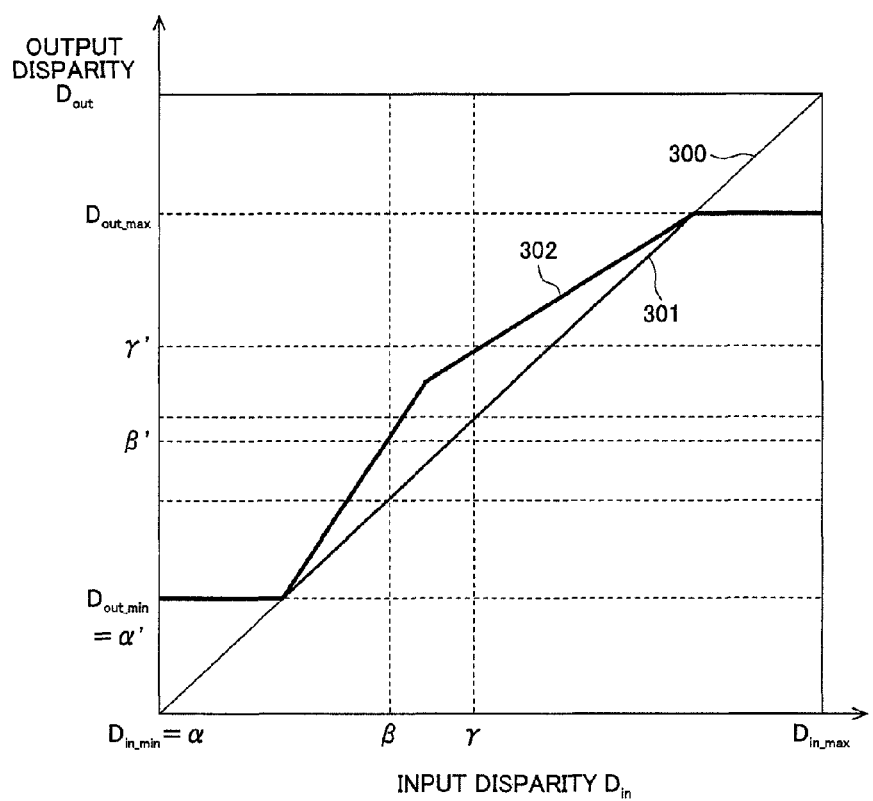
FIG. 9 is a graph of a disparity conversion equation executing the disparity conversion of a disparity corrected by clipping.

A disparity γ of a main object 1600 of FIG. 16 is increased to a disparity γ' by the disparity conversion equation depicted in FIG. 9. A disparity ρ of a main object 1601 of FIG. 16 is increased to a disparity β' by the disparity conversion equation depicted in FIG. 9.

Figure 10:
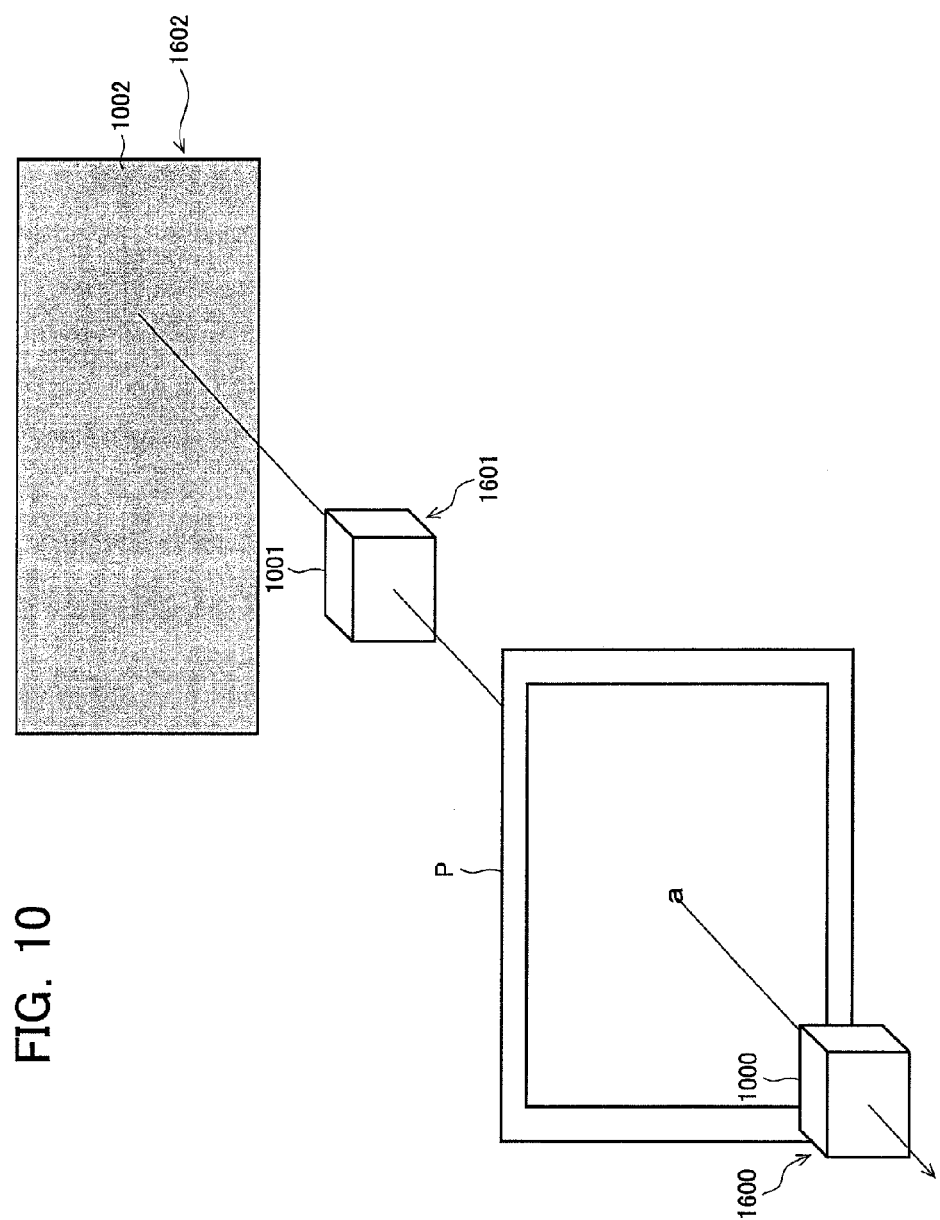
FIG. 10 is a schematic of a state of a three-dimensional image after the disparity conversion perceived by a viewer.

FIG. 10 is a schematic of how a three-dimensional image after the disparity conversion is perceived.

By increasing the disparities, the main object 1600 is perceived in the vicinity of a position 1000 and the main object 1601 is perceived in the vicinity of a position 1001. In this way, depth amounts can be enlarged to enhance the three-dimensional effect.

Figure 17:
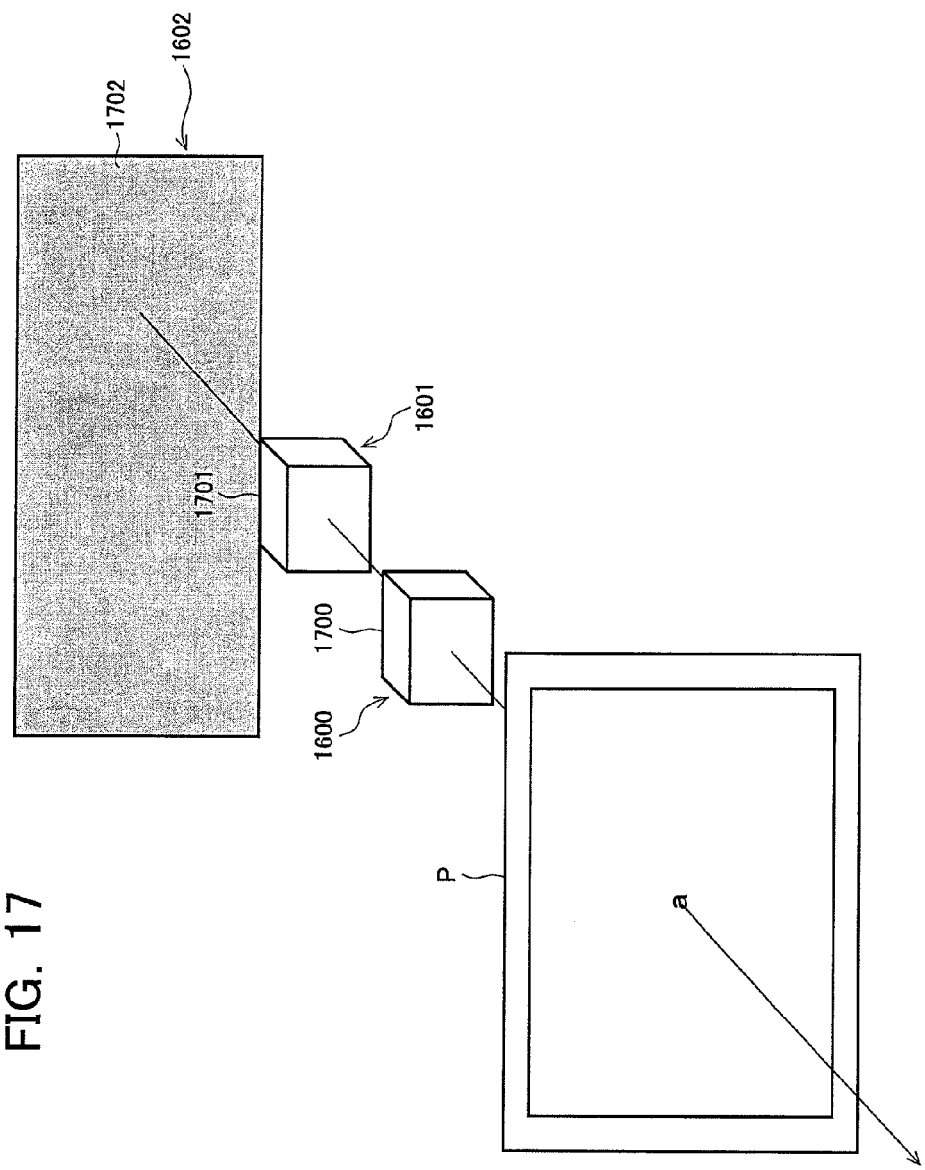
FIG. 17 is a schematic of a state of a three-dimensional image perceived by a viewer.

As compared to FIG. 17, by increasing the disparities, differences between the position of the background 1602 and the positions of the main objects 1600 and 1601 are clearly perceived. As a result, an image can be displayed with the enhanced three-dimensional effect.

Such conversion of a disparity of a main object can enhances the three-dimensional effect of the main object and a surrounding portion of the main object. If the main object has a thickness, an average value of the maximum and minimum disparities of the main object is defined as the disparity of the main object. If a plurality of main objects exists, average values of the maximum and minimum disparities of a plurality of the main objects are defined as the disparities of the main objects. This is preferred since the disparities (display positions) of the main objects can be converted in consideration of the thicknesses of the main objects. It is preferred to calculate an average of disparity in consideration of an area of a region since a display position can be converted in consideration of the center of gravity of a main object.

As described above, the disparity conversion portion 103 extracts a disparity (after correction) for each pixel of a main object determined by the main object determination portion 102 from the disparity image input from the disparity correction portion 101, converts the extracted disparity of each pixel based on the predetermined conversion equation depicted in FIG. 7 or 8, and stores the converted disparity for each pixel of the corresponding main object. The disparity conversion portion 103 outputs the disparity image storing the converted disparity to the image generation portion 104.

The image generation portion 104 generates a three-dimensional image based on a captured image input from an external apparatus etc., and the disparity image input from the disparity conversion portion 103.

A three-dimensional image generating method will hereinafter be described. A captured image, a disparity image, and an output image are denoted by I, D, and O, respectively. A pixel value at coordinates (x, y) in the images is represented by I (x, y) and D (x, y). An image horizontally moved by a disparity from the captured image I to the output image O is created by using (Eq. 11).

[Equation 11]

$$O(x+D(x,y),y)=I(x,y) \quad \text{(Eq. 11)}$$

At this point, if pixels overlap with each other, a pixel with a larger disparity (an object located at a position closer to a camera) is used and, if a pixel is not filled, the pixel is interpolated by using upper, lower, left, and right pixels. The captured image I and the output image O are output as the left image and the right image, respectively.

With the configuration described above, even if a value of disparity between the main object and the foreground or background is small, the disparity can be converted to enlarge the difference of disparity between the main object and the foreground or background.

As a result, a depth amount between the main object and the foreground or background can be converted to generate an image with the three-dimensional effect enhanced within a three-dimensionally viewable range for an observer.

Although linear conversion is used for the correction and conversion of disparity in the disparity correction portion 101 and the disparity conversion portion 103 in this embodiment, nonlinear conversion can be used to acquire the same effect.

Although one set of input and output disparities $D_{in0}$ and $D_{out0}$ is used in this embodiment, two or more sets can be used for converting the disparity to acquire the same effect.

Second Embodiment

A second embodiment of the present invention will hereinafter be described in detail with reference to the drawings. However, the portions having the same functions as the first embodiment are denoted by the same reference numerals.

Figure 11:
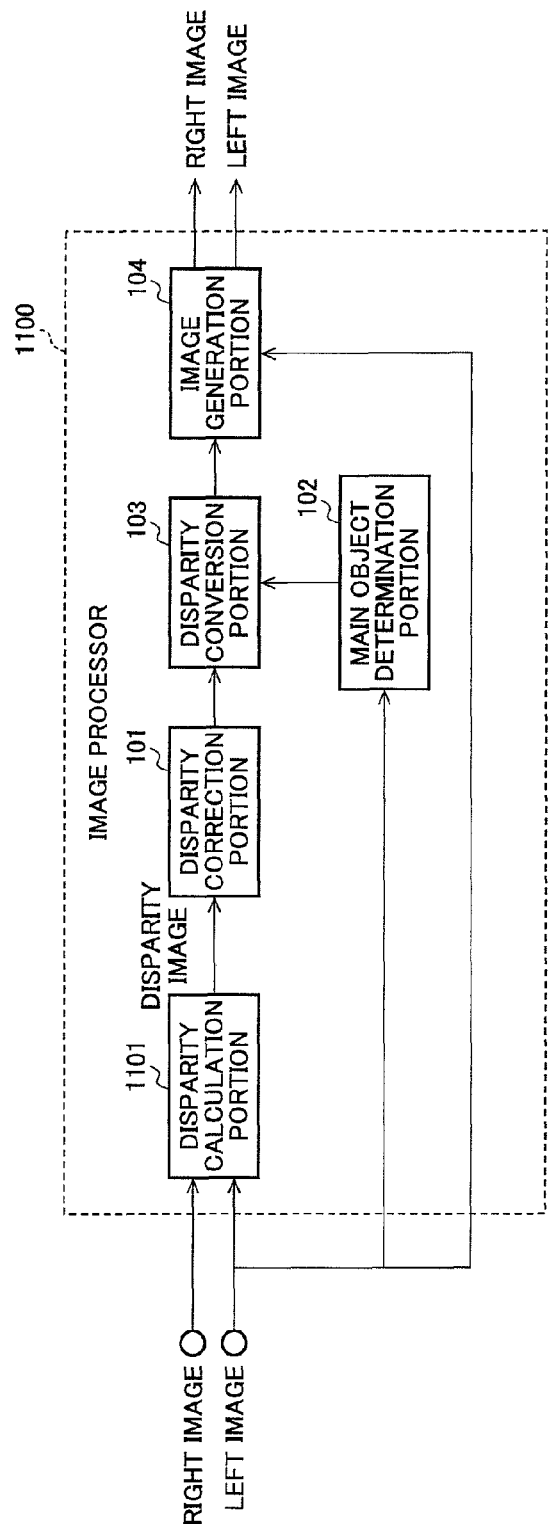
FIG. 11 is a functional block diagram of an image processor described in a second embodiment.

FIG. 11 is a functional block diagram of an image processor 1100 of the present invention described in the second embodiment.

The image processor 1100 is formed by adding a disparity calculation portion 1101 to the image processor 100 described with reference to FIG. 1 and uses two captured images acquired by shooting an identical object from two viewing positions as inputs to generate a three-dimensional image based on the captured images.

The two captured images acquired by shooting an identical object from at least two viewing positions are input to the disparity calculation portion 1101. Any one of the two captured images is input to the main object determination portion 102 and the image generation portion 104. One captured image of the two captured images is a captured image shot by a camera on the left side facing the object and this image is referred to as a left image. The other captured image is a captured image shot by a camera on the right side facing the object and this image is referred to as a right image.

The left and right images are input to the disparity calculation portion 1101 and the left image is input to the main object determination portion 102 and the image generation portion 104.

The disparity calculation portion 1101 calculates a disparity based on the left and right images. The disparity calculation portion 1101 generates a disparity image described in the first embodiment based on the calculated disparity. The disparity can be calculated by using a well-known technique and, for example, a block matching method can be used. The block matching method is a method of calculating a disparity by checking the left and right images against each other on the basis of an appropriately determined block to define the most similar blocks between images as corresponding blocks.

The disparity calculation portion 1101 outputs the generated disparity image to the disparity correction portion 101.

The disparity correction portion 101 corrects a disparity of the disparity image input from the disparity calculation portion 1101 within a predetermined range. In other words, the disparity calculated by the disparity correction portion 101 is corrected within a predetermined range.

At the time of this correction, the disparity can be adjusted such that an interval between the camera taking the left image and the camera taking the right image (a base-line length) is exceeded. When a three-dimensional image is taken, the base-line length is often set to 65 mm. This is because a width between human eyes is about 65 mm.

However, in some cases, an image must be taken with a base-line length equal to or less than 65 mm because of a relationship of arrangement positions of cameras. When the same object is shot in the same composition, the disparity is reduced as the base-line length decreases and, therefore, a sense of depth is reduced. The disparity correction portion 101 prevents the reduction of the sense of depth by performing the correction such that the minimum value and the maximum value of the input disparity are expanded. Therefore, an image taken with an arbitrary base-line length can be generated from an image taken with a fixed base-line length.

Figure 12:
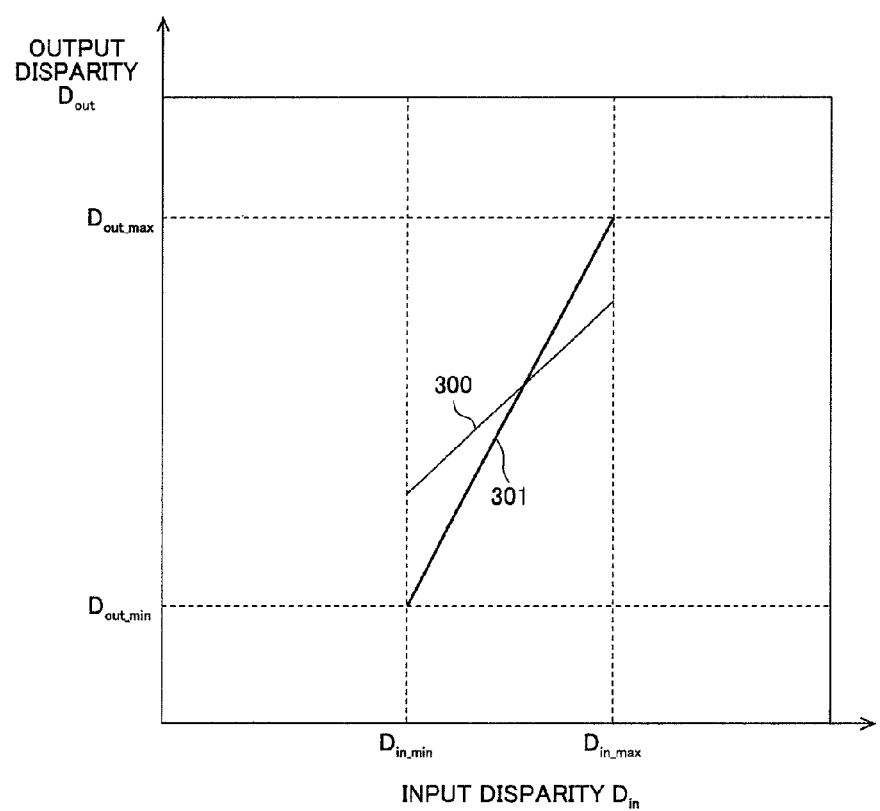
FIG. 12 is a graph of an example of a disparity expansion.

FIG. 12 is a graph of an example of disparity expansion. The horizontal and vertical axes etc., of FIG. 12 are the same as FIG. 3 and will not be described. A disparity of a disparity image generated based on left and right images taken with a short base-line length is indicated by a line 300. For example, it is assumed that $D_{in\_max}$ (the maximum disparity of the disparity image) and $D_{out\_max}$ (the maximum value of three-dimensionally viewable disparity) are 100 and 200, respectively. A value before the disparity correction only allows the display within a range of disparity of 100. Therefore, (Eq. 1) described above is used for correcting the disparity indicated by the line 300 to the disparity indicated by the line 301.

When the disparity is corrected by using (Eq. 1), $D_{in\_max}$ is corrected to $D_{out\_max}$. A value after the disparity correction allows the display to the maximum value of the output disparity in the display apparatus. In other words, an image taken with an arbitrary base-line length can be generated from an image taken with a fixed base-line length. The three-dimensional effect can also be enhanced in accordance with the depth amount of the display apparatus.

The disparity correction portion 101 outputs a disparity image storing a corrected disparity to the disparity conversion portion 103.

Figure 13:
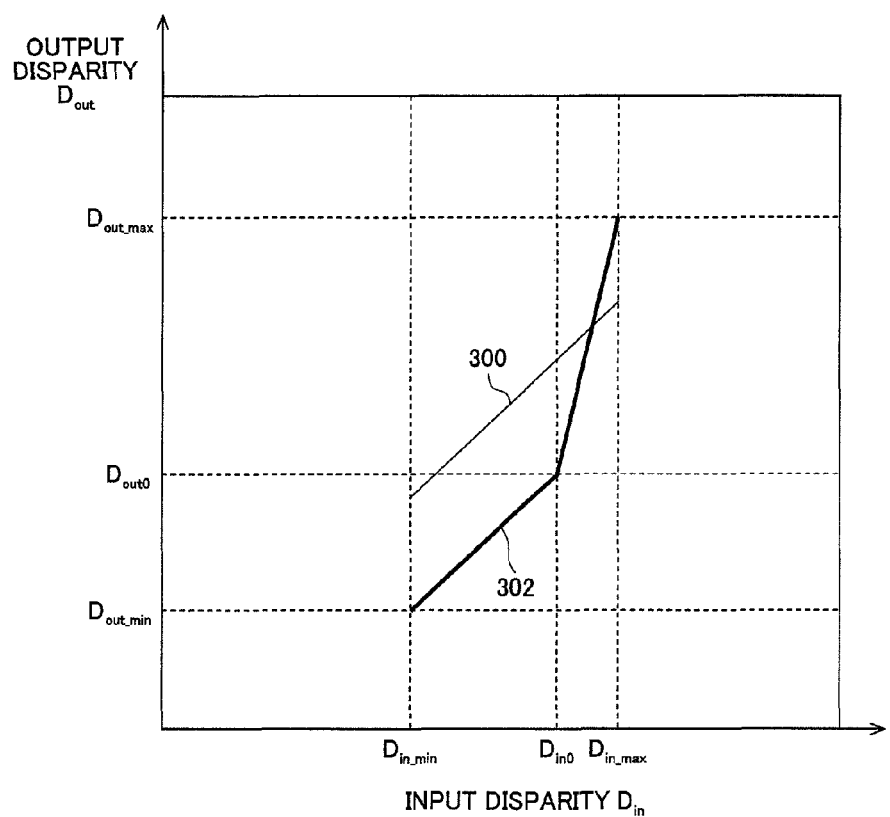
FIG. 13 is a graph of a disparity conversion equation executing the disparity conversion of a disparity corrected by normalization.

As described above, the disparity conversion portion 103 converts the disparity of the main object through the disparity conversion depicted in FIG. 13 corresponding to FIG. 7 and outputs a disparity image storing the converted disparity to the image generation portion 104. For the disparity conversion of FIG. 13, (Eq. 5) and (Eq. 6) described above are used.

Specifically, the disparity conversion portion 103 converts the disparity calculated by the disparity calculation portion 1101 (disparity of the disparity image created by the disparity calculation portion 1101) such that a disparity corresponding to the main object determined by the main object determination portion 102 reaches a predetermined value. The predetermined value is, for example, zero, or a value within a predetermined range based on zero. The predetermined value is adjustable.

The image generation portion 104 generates a three-dimensional image based on the left image input from an external apparatus etc., and the disparity image input from the disparity conversion portion 103. The generation of the three-dimensional image has been described in the first embodiment and therefore will not be described.

With the configuration described above, an image with the three-dimensional effect enhanced within a three-dimensionally viewable range for an observer can easily be generated. The disparity of a disparity image generated based on left and right images taken with a shorter base-line length can be corrected to generate an image as if the image is taken with a longer base-line length. This is particularly effective when a three-dimensional image is generated based on the left and right images taken in a situation where a base-line length cannot be made longer, for example, the left and right images of endoscopic cameras or cameras built into a small device, and the three-dimensional effect of an object is enhanced.

(Third Embodiment)

A third embodiment of the present invention will hereinafter be described in detail with reference to the drawings. However, the portions having the same functions as the first embodiment are denoted by the same reference numerals.

Figure 14:
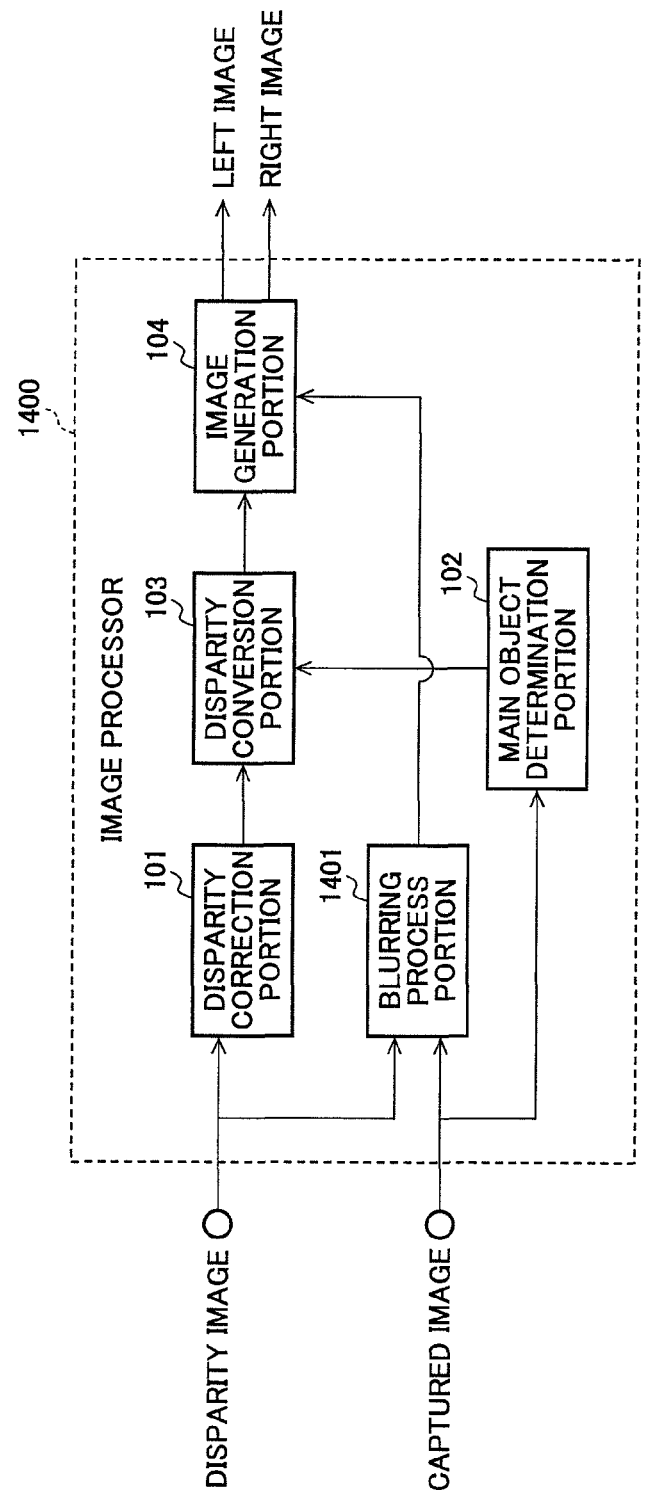
FIG. 14 is a functional block diagram of an image processor described in a third embodiment.

FIG. 14 is a functional block diagram of an image processor 1400 of the present invention described in the third embodiment.

The image processor 1400 of FIG. 14 is formed by adding a blurring process portion 1401 to the image processor 100 described with reference to FIG. 1.

A disparity image input from an external apparatus etc., is input to the disparity correction portion 101 and the blurring process portion 1401. A captured image input from an external apparatus etc., is input to the main object determination portion 102 and the blurring process portion 1401.

The blurring process portion 1401 executes a blurring process for a pixel value of the captured image corresponding to an object having a disparity equal to or less than a first predetermined value or equal to or greater than a second predetermined value based on the input disparity and captured images. The blurring process portion 1401 outputs the captured image subjected to the blurring process to the image generation portion 104. The first predetermined value<the second predetermined value is satisfied. In this case, the blurring process portion 1401 increases a blurring amount corresponding to a pixel value of a main object in proportion to an absolute value of disparity of the main object in the captured image.

Figure 2:
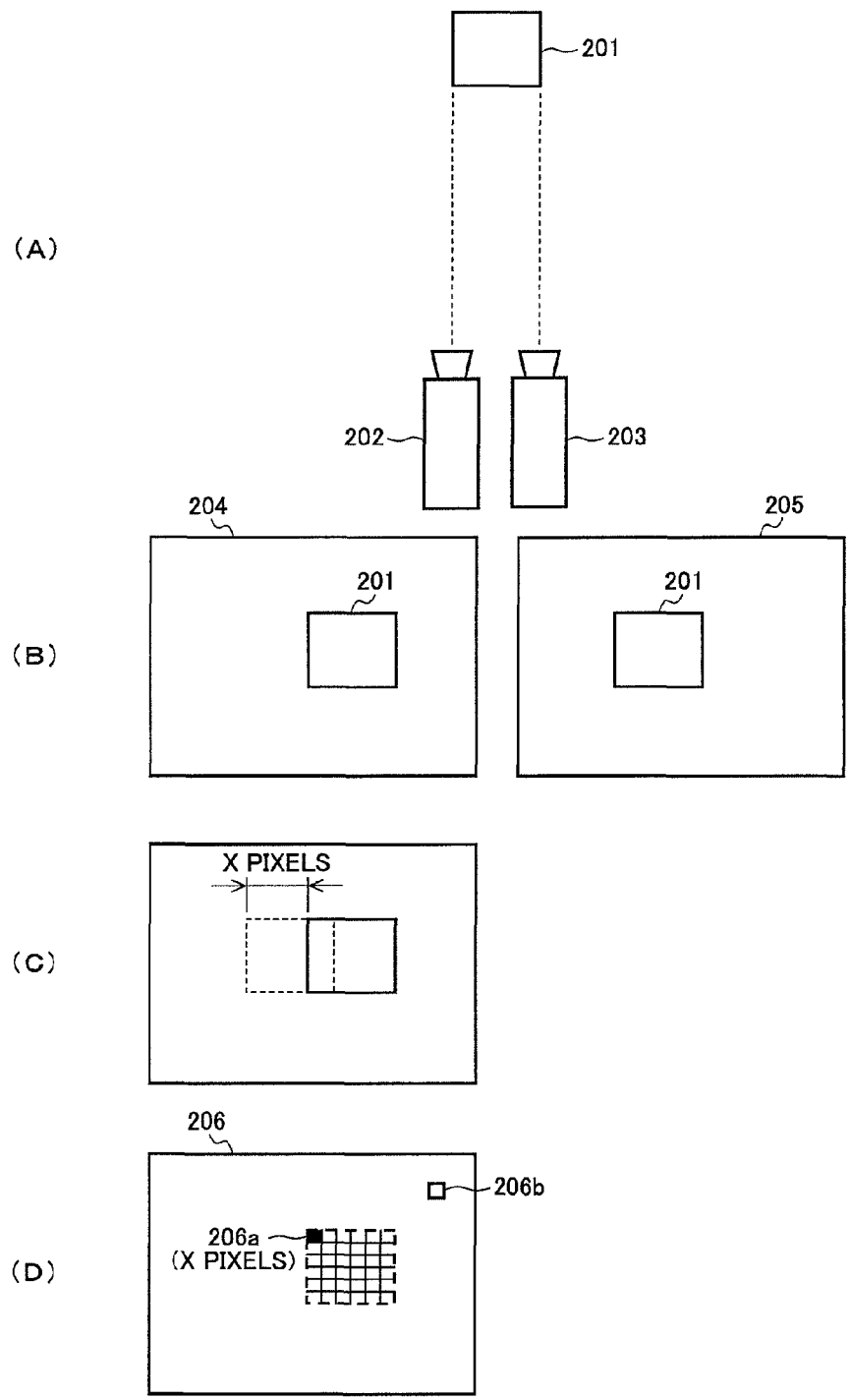
FIG. 2 is a diagram for explaining a disparity image.

In the example of FIG. 2, if the disparity X of the object 201 is equal to or less than the first predetermined value or equal to or greater than the second predetermined value, the blurring process portion 1401 executes the blurring process for a pixel value of the captured image corresponding to the object 201.

Figure 15:
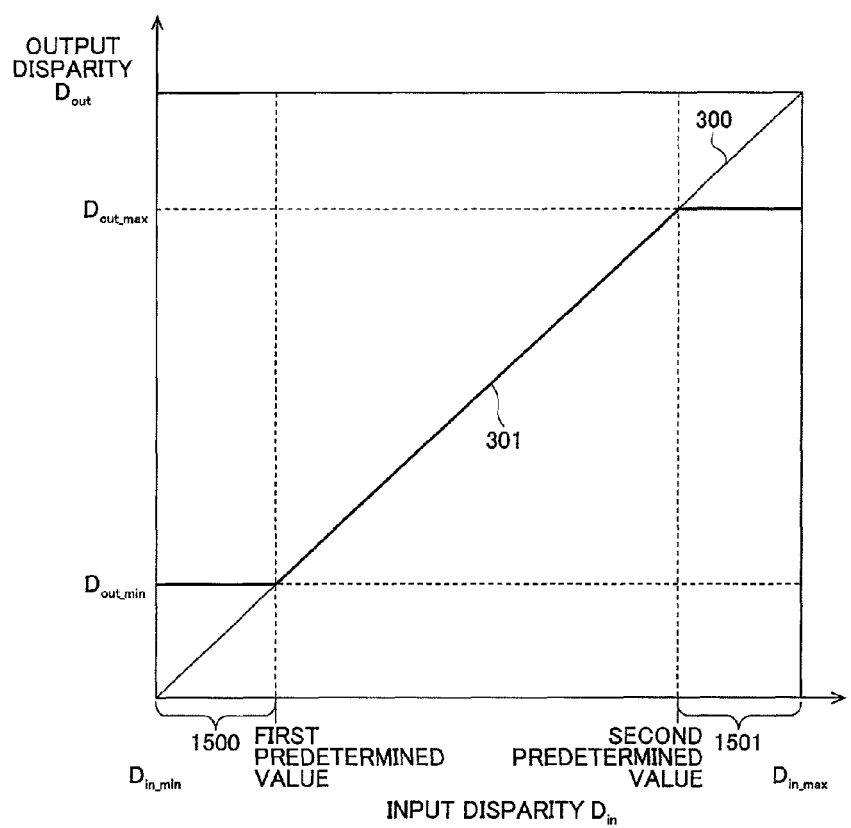
FIG. 15 is a graph of a disparity correction equation clipping a disparity.

The first predetermined value and the second predetermined value will be described with reference to FIG. 15. FIG. 15 is a graph corresponding to the graph of FIG. 4. The disparity equal to or less than the first predetermined value corresponds to a range of disparity indicated by reference numeral 1500 and the disparity equal to or greater than the second predetermined value corresponds to a range indicated by reference numeral 1501.

If the object to be blurred by the blurring process portion 1401 is an object having a disparity equal to or less than the first predetermined value (in the range indicated by reference numeral 1500), i.e., an object having a disparity equal to or less than $D_{out\_min}$ (the minimum value of the three-dimensionally viewable disparity), the blurring process portion 1401 makes a blurring amount of the object larger when the disparity of the object is smaller (the object is located further from the camera position).

This process generates an image with blur in the area perceived as being depressed as compared to the range of the three-dimensionally viewable disparity. The image subjected to this blurring process is displayed as if a depth of field is reduced from that of the actual shooting. In an image with a depth of field reduced, a sense of depth can easily be sensed because a background is blurred depending on a distance between an object and a camera.

If the object to be blurred by the blurring process portion 1401 is an object having a disparity equal to or greater than the second predetermined value (in the range indicated by reference numeral 1501), i.e., an object having a disparity equal to or less greater $D_{out\_max}$ (the maximum value of the three-dimensionally viewable disparity), the blurring process portion 1401 makes a blurring amount of the object larger as the disparity of the object becomes greater (the object is located closer to the camera position).

This processing can blur a range which is difficult for three-dimensional viewing and, therefore, an easily viewable three-dimensional image can be acquired. If an object having a disparity equal to or less than the first predetermined value and an object having a disparity equal to or greater than the second predetermined value are blurred at the same time, a three-dimensional image can be acquired with a three-dimensionally viewable range having higher visual attractiveness.

The blurring process can be implemented with a well-known method. Representative methods of the blurring process include a smoothing filter, a Gaussian filter, etc. The smoothing filter is a technique of averaging pixel values by using pixel values around a pixel of interest to acquire a pixel value of a processed image. For a pixel of interest of the object to be blurred, eight neighboring pixel values in 3×3 pixels can be used for the averaging, or 24 neighboring pixel values in 5×5 pixels can be used for the averaging. As the number of peripheral pixel values used for the averaging is increased, a blurring amount of a processed pixel value becomes greater.

Therefore, if an object having a disparity equal to or less than the first predetermined value (equal to or less than $D_{out\_min}$) is the object to be blurred, the blurring amount is made inversely proportional to the disparity and, if an object having a disparity equal to or greater than the second predetermined value (equal to or greater than $D_{out\_max}$) is the object to be blurred, the blurring amount is made proportional to the disparity.

Therefore, the blurring process portion 1401 increases a blurring amount corresponding to a pixel value of a main object in proportion to an absolute value of disparity of the main object in the captured image.

By executing this blurring process, a depth relationship can be retained even if a disparity included in a range difficult for three-dimensional viewing is clipped. Since the blurring process is executed depending on a disparity of each pixel of the captured image, a level of blur of each pixel is varied depending on a disparity and the same blurring effect as an image taken by a camera is acquired rather than uniform blur.

The blurring process portion 1401 outputs the captured image after the execution of the blurring process to the image generation portion 104.

The disparity correction portion 101 corrects a disparity with the clipping method as described with referenced to FIG. 4 and outputs a disparity image storing the corrected disparity to the disparity conversion portion 103. The disparity conversion portion 103 converts the disparity of the main object and outputs the disparity image storing the converted disparity to the image generation portion 104 as described above.

The image generation portion 104 generates a three-dimensional image based on the captured image input from the blurring process portion 1401 and the disparity image input from the disparity conversion portion 103.

By executing the disparity conversion with the configuration described above, an image with the three-dimensional effect enhanced within a three-dimensionally viewable range for an observer can easily be generated. By executing the blurring process for a captured image based on a disparity image before executing the disparity correction, a blurring amount does not become constant even in a range with a saturated disparity and a three-dimensional image can be generated with an enhanced three-dimensional effect.

The image processor of the present invention can easily generate a three-dimensional video with a three-dimensional (depth) effect enhanced between an object and a background (or foreground) within a three-dimensionally viewable range.

The embodiments described above are also applicable to an integrated circuit/chipset mounted on the image processor.

The image processor of the present invention is applicable to an image display apparatus capable of displaying a three-dimensional image. An image can be displayed with an enhanced three-dimensional effect by including the image processor of the present invention. The image processor of the present invention is applicable to various image display apparatuses having display surfaces different in size and resolution.

The image processor of the present invention is also applicable to an image taking apparatus capable of taking a three-dimensional image and this is preferred since an image can be taken while a result of taking a three-dimensional image is previewed.

Explanations of Letters or Numerals 100, 1100, 1400 . . . image processor; 101 . . . disparity correction portion; 102 . . . main object determination portion; 103 . . . disparity conversion portion; 104 . . . image generation portion; 1101 . . . disparity calculation portion; 1401 . . . blurring process portion; 201 . . . object; 202, 203 . . . camera; 204 . . . left image; 205 . . . right image; 206 . . . disparity image; and 206a, 206b . . . pixel.

The invention claimed is:

1. An image processor receiving inputs of a captured image from one view point and a disparity image corresponding to the captured image, comprising:

a blurring process portion for executing a blurring process for a pixel of the captured image corresponding to an object having a disparity of the disparity image equal to or less than a first predetermined value or equal to or greater than a second predetermined value in proportion to an absolute value of the disparity;

a disparity correction portion for saturating a disparity out of a predetermined range in the disparity image;

a disparity conversion portion for converting a disparity corresponding to at least one main object of the captured image into a predetermined value; and an image generation portion for generating a three-dimensional image based on the captured image subjected to the blurring process by the blurring process portion and the disparity image corrected by the disparity correction portion and having the disparity corresponding to the main object converted by the disparity conversion portion, the image processor generating a three dimensional image.

2. The image processor as defined in claim 1, wherein the captured image is one of two captured images acquired by shooting an identical object from two viewing positions, and the disparity image is a disparity image calculated from the two captured images.

3. The image processor as defined in claim 1, wherein the disparity conversion portion converts the disparity corresponding to the main object into the predetermined value based on a linear function prescribing a relationship between an input disparity and an output disparity, and a graph showing the relationship between the input disparity and the output disparity is made by connecting a plurality of line segments having different slopes.

4. The image processor as defined in claim 1, wherein the predetermined value is zero or a value within a predetermined range based on zero.

5. The image processor as defined in claim 1, wherein the predetermined range of the disparity image has a minimum value equal to or less than the first predetermined value and a maximum value equal to or greater than the second predetermined value.

6. An image display apparatus comprising: the image processor as defined in claim 1.

7. An image taking apparatus comprising: the image processor as defined in claim 1.

* * * * *